(12) United States Patent
Miyoshi et al.

(10) Patent No.: US 7,168,441 B2
(45) Date of Patent: Jan. 30, 2007

(54) FUEL CUTOFF VALVE

(75) Inventors: Keiji Miyoshi, Aichi-ken (JP); Hiroshi Nishi, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 165 days.

(21) Appl. No.: 10/852,160

(22) Filed: May 25, 2004

(65) Prior Publication Data
US 2004/0238033 A1 Dec. 2, 2004

(30) Foreign Application Priority Data
May 30, 2003 (JP) ............................. 2003-154089
Mar. 19, 2004 (JP) ............................. 2004-079565

(51) Int. Cl.
*F16K 24/04* (2006.01)
(52) U.S. Cl. ..................... 137/202; 137/43; 137/411
(58) Field of Classification Search ............... 137/43, 137/202, 411
See application file for complete search history.

(56) References Cited

U.S. PATENT DOCUMENTS

| 5,582,198 | A | * | 12/1996 | Nagino et al. ........... 137/43 |
| 6,145,532 | A | * | 11/2000 | Tuckey et al. ........... 137/202 |
| 6,286,539 | B1 | * | 9/2001 | Nishi et al. ........... 137/202 |
| 6,311,675 | B2 | * | 11/2001 | Crary et al. ........... 123/516 |
| 6,412,511 | B1 | * | 7/2002 | Rosseel ........... 137/43 |
| 6,508,263 | B1 | * | 1/2003 | Jahnke et al. ........... 137/202 |
| 6,591,855 | B2 | * | 7/2003 | Nishi et al. ........... 137/202 |
| 6,679,282 | B2 | * | 1/2004 | Aoki et al. ........... 137/202 |
| 6,755,206 | B2 | * | 6/2004 | Nishi et al. ........... 137/202 |
| 2003/0066558 | A1 | * | 4/2003 | Muto et al. ........... 137/202 |
| 2003/0098063 | A1 | * | 5/2003 | Mori et al. ........... 137/202 |

* cited by examiner

*Primary Examiner*—Eric Keasel
*Assistant Examiner*—Craig Price
(74) *Attorney, Agent, or Firm*—Posz Law Group, PLC

(57) ABSTRACT

A fuel cutoff valve of the invention includes a casing body having a valve chamber and a holder element, a float having a seat member on its top, a movable valve element that is fitted in the holder element in a vertically movable manner, and a first connection conduit and a second connection conduit that connect inside of the valve chamber with outside. When the fuel level in a fuel tank rises to a preset first fluid level, the float moves up to shut off the first connection conduit. When the fuel level further rises to a preset second fluid level, the float further moves up to press the movable valve element up and shut off the second connection conduit. The fuel cutoff valve of this simple structure effectively prevents a blowing back flow of fuel in the course of fuel supply without requiring any subtle setting of a spring load.

14 Claims, 14 Drawing Sheets

FUEL CUTOFF VALVE

This application claims the benefit of and priority from Japanese Application No. 2003-154089 filed May 30, 2003 and Japanese Application No. 2004-79565 filed Mar. 19, 2004, the contents of which are incorporated herein by reference.

BACKGROUND OF THE INVENTION

1. Field of the Invention

The present invention relates to a fuel cutoff valve that is attached to the top of a fuel tank and opens and shuts off a connection conduit for connecting inside of the fuel tank with outside to connect and disconnect the inside of the fuel tank to and from the outside.

2. Description of the Related Art

A known fuel cutoff valve as disclosed in JP No. 2000-130271A has the structure shown in FIG. 18. FIG. 18 is a sectional view showing a fuel cutoff valve 100 attached to the top of a fuel tank. The fuel cutoff valve 100 includes a casing body 110 that has a valve chest 110S for connecting inside of the fuel tank with outside, a float 120 that is received in the valve chest 110S and moves up and down according to the fluid level in the fuel tank, a spring 122 that is located above the float 120, a first valve disc 124 that is mounted on the top end of the spring 122, and a second valve disc 126 that is located on the center of the float 120.

In the fuel cutoff valve 100 of the above structure, when the fuel level in the fuel tank reaches a preset first fluid level by the supply of fuel, the float 120 moves up and causes the first valve disc 124 to shut off a first connection conduit 112b. When the fuel level further rises to a preset second fluid level, which is higher than the preset first fluid level, the second valve disc 126 shuts off a second connection conduit 131a against the pressing force of the spring 122. The second connection conduit 131a has a narrower passage area than the first connection conduit 112b. Namely the passage area is narrowed in two stages according to the fuel level. This does not seal the fuel tank abruptly and prevents a blowing back flow of the fuel at a filler neck.

In the prior art fuel cutoff valve 100, the preset second fluid level that causes the second valve disc 126 to shut off the second connection conduit 131a is specified by the load of the spring 122. Significant labor and time are thus required for setting the load of the spring 122 and its regulation.

SUMMARY OF THE INVENTION

The object of the invention is thus to provide a fuel cutoff valve that effectively prevents a blowing back flow of fuel in the course of fuel supply without requiring any troublesome setting or regulation of a spring load.

In order to attain at least part of the above and the other related objects, the present invention is directed to a fuel cutoff valve that is attached to top of a fuel tank and connects and disconnects inside of the fuel tank to and from outside. The fuel cutoff valve includes: a casing body that has a valve chest to connect the inside of the fuel tank with the outside and a holder element located above the valve chest; a movable valve element that is held by the holder element in a vertically movable manner; a first connection conduit and a second connection conduit that are provided to face the movable valve element and to connect inside of the valve chest with outside; and a valve mechanism that is received in the valve chest and has a float moving up and down according to a fuel level in the fuel tank. The valve mechanism has a seat plane, which moves up with an upward movement of the float to shut off the first connection conduit when the fuel level rises to a preset first fluid level, while further moving up with a further upward movement of the float to press the movable valve element up and to shut off the second connection conduit when the fuel level rises to a preset second fluid level that is higher than the preset first fluid level.

When the supply of fuel is fed to the fuel tank with the fuel cutoff valve of the invention and raises the fuel level in the fuel tank, the fuel vapor remaining in the upper portion of the fuel tank is released through the first connection conduit and the second connection conduit to the canister. When the fuel level in the fuel tank reaches the preset first fluid level, the float moves up by its buoyancy and causes the seat plane to shut off the first connection conduit. This increases the internal pressure of the fuel tank and raises the fuel level in a filler pipe.

An auto stop function may be triggered to stop the supply of fuel from a fuel gun by detection of the increased internal pressure of the fuel tank with a sensor or by detection of the fuel level in the filler pipe to the level of the fuel gun. In this state, the second connection conduit is kept open, while the first connection conduit is closed. This arrangement effectively prevents an abrupt increase in internal pressure of the fuel tank and thereby a blowing back flow of the fuel.

When the further supply of fuel raises the fuel level to the preset second fluid level, the float further moves up to press the movable valve element up and causes the seat plane to shut off the second connection conduit. The fuel tank is then sealed from the canister to prevent an outflow of the fuel.

The movable valve element of the invention is attached to the holder element of the casing body. This desirably simplifies the structure of the fuel cutoff valve, compared with the structure of the prior art fuel cutoff valve having a float attached to the top of another float.

The preset second fluid level, which is higher than the preset first fluid level, is specified by the own weight of the movable valve element and the buoyancy of the float. This arrangement does not require any spring to regulate the second-stage floating position of the float as discussed in the prior art technique. This simplifies the assembly of the fuel cutoff valve and does not require any subtle regulation of the spring load.

In one preferable embodiment of the invention, the movable valve element has a cylindrical movable main body, the first connection conduit is formed in the movable main body, and the second connection conduit is formed in a space between the movable main body and the holder element.

In one preferable structure for closing the first and the second connection conduits, a seat member is located above the float to open and close the first connection conduit and the second connection conduit. In another preferable structure, a first seat member is located above the float to open and close the first connection conduit, and a second seat member is formed on the movable valve element to open and close the second connection conduit.

The fuel cutoff valve may have a spring that works against an upward force of the movable valve element. This facilitates setting of a condition for closing the movable valve element.

In one preferable embodiment of the fuel cutoff valve of the invention, the valve mechanism includes: a first valve disc mechanism that has a first valve disc; and a second valve disc mechanism that has the float and supports the first valve disc in a vertically movable manner. The seat plane has a first seat plane and a second seat plane. The first seat plane is formed on top of the first valve disc and is designed to move up on a flow of fuel vapor from the valve chest to the first connection conduit and shut off the first connection conduit when the fuel level rises to the preset first fluid level. The second seat plane is formed on top of the float and is designed to shut off the second connection conduit with an upward movement of the float.

When the flow of fuel vapor from the valve chest to a canister makes an ascending flow of fuel vapor toward the first connection conduit in the course of fuel supply, the first valve disc moves up to shut off the first connection conduit. Namely the first valve disc of the first valve disc mechanism is a separate body from the second valve disc mechanism. The ascending flow of fuel vapor causes the first valve disc to shut off the first connection conduit and thereby weaken the force of further moving up the float. The second connection conduit is thus not shut off when the fuel level is the preset first fluid level. When the fuel level further rises to the preset second fluid level, the second connection conduit is shut off by a second valve disc of the second valve disc mechanism.

The second valve disc may be integrated with the float or may be constructed as a separate body from the float. In the latter structure, the second valve disc has a valve disc connection hole for connecting the valve chest with the second connection conduit, and the float has a valve plug that opens and closes the valve disc connection hole with a vertical movement of the float. When the fuel level is lowered by consumption of the fuel, the float moves down and causes the valve plug located on the top of the float opens the valve disc connection hole. This reduces the force in the valve-closing direction applied to the second valve disc and the first valve disc and enhances the valve-reopening properties to ensure smooth opening of the second valve disc and the first valve disc.

These and other objects, features, aspects, and advantages of the present invention will become more apparent from the following detailed description of the preferred embodiments with the accompanying drawings.

DESCRIPTION OF THE PREFERRED EMBODIMENTS

A. First Embodiment (1) General Structure of Fuel Cutoff Valve 20

Figure 1:
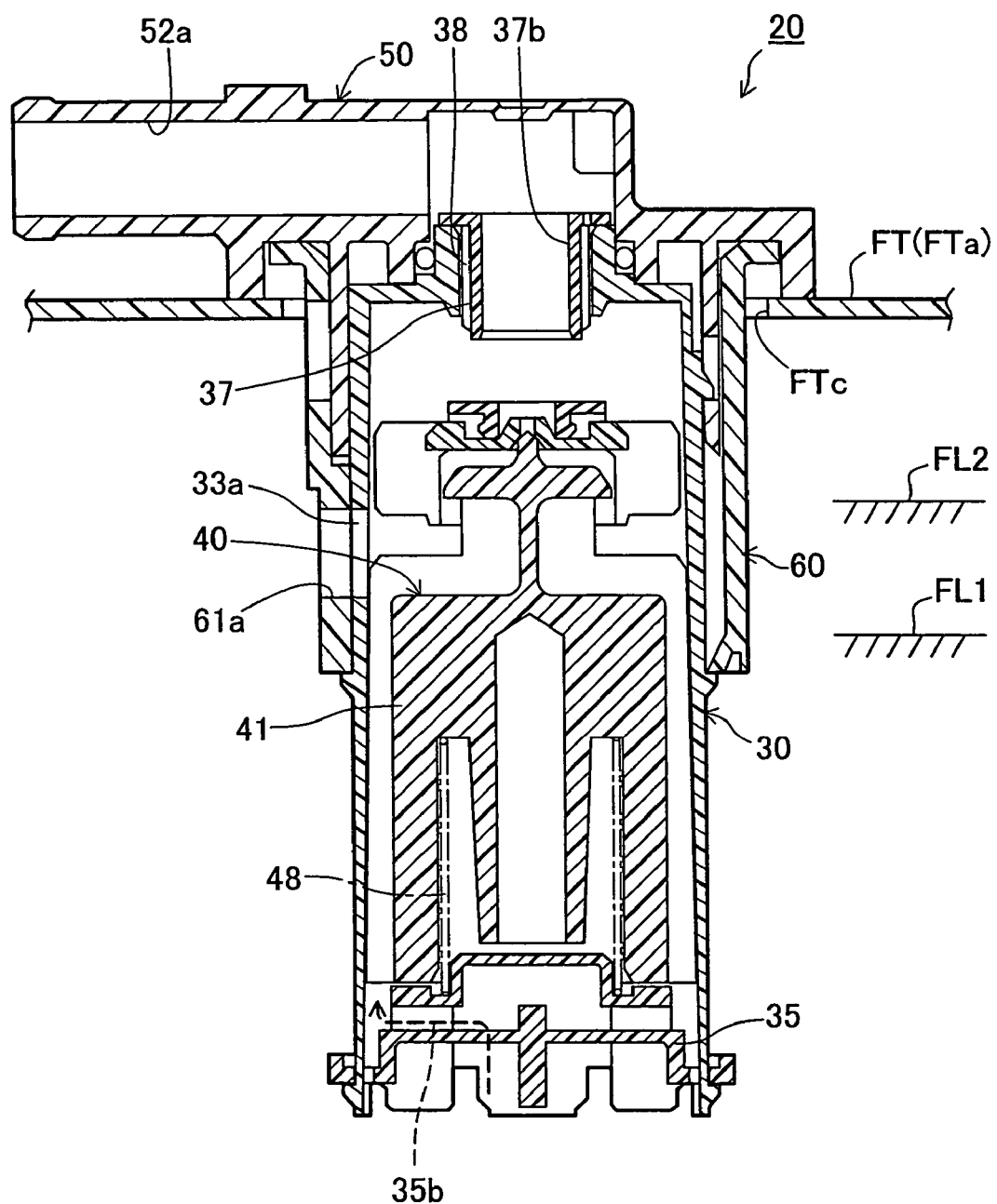
FIG. 1 is a sectional view showing a fuel cutoff valve attached to the upper wall of a fuel tank of an automobile in a first embodiment of the invention.

FIG. 1 is a sectional view showing a fuel cutoff valve 20 attached to the top of a fuel tank FT of an automobile in a first embodiment of the invention. The fuel tank FT has a surface layer made of a composite resin material containing polyethylene and a mounting hole FTc formed in a tank upper wall FTa. The fuel cutoff valve 20 has its lower section fitted in the mounting hole FTc, so as to be attached to the tank upper wall FTa. The fuel cutoff valve 20 closes with slight air ventilation when the fuel level in the fuel tank FT rises the fuel tank FT to a preset first fluid level FL1 in the fuel feeding process, and completely shuts off to restrict outflow of the fuel to an external canister when the fuel level rises to a preset second fluid level FL2.

(2) Structures of Respective Parts of Fuel Cutoff Valve 20

The fuel cutoff valve 20 has a casing body 30, a bottom support plate 35, a movable valve element 37, a valve mechanism 40, a spring 48, a cover 50, and a support member 60 as primary constituents. The casing body 30, the bottom support plate 35, the movable valve element 37, a float 41, and the support member 60 are made of a synthetic resin having excellent fuel oil resistance, polyacetal. The cover 50 is made of polyethylene that has excellent fuel oil resistance and is thermally weldable to the fuel tank FT. Although both these resin materials have fuel swelling resistance, polyacetal used as the material of the casing body 30, the movable valve element 37, and the float 41 has better fuel swelling resistance to ensure the enhanced valve sealing properties than polyethylene used as the material of the cover 50.

Figure 2:
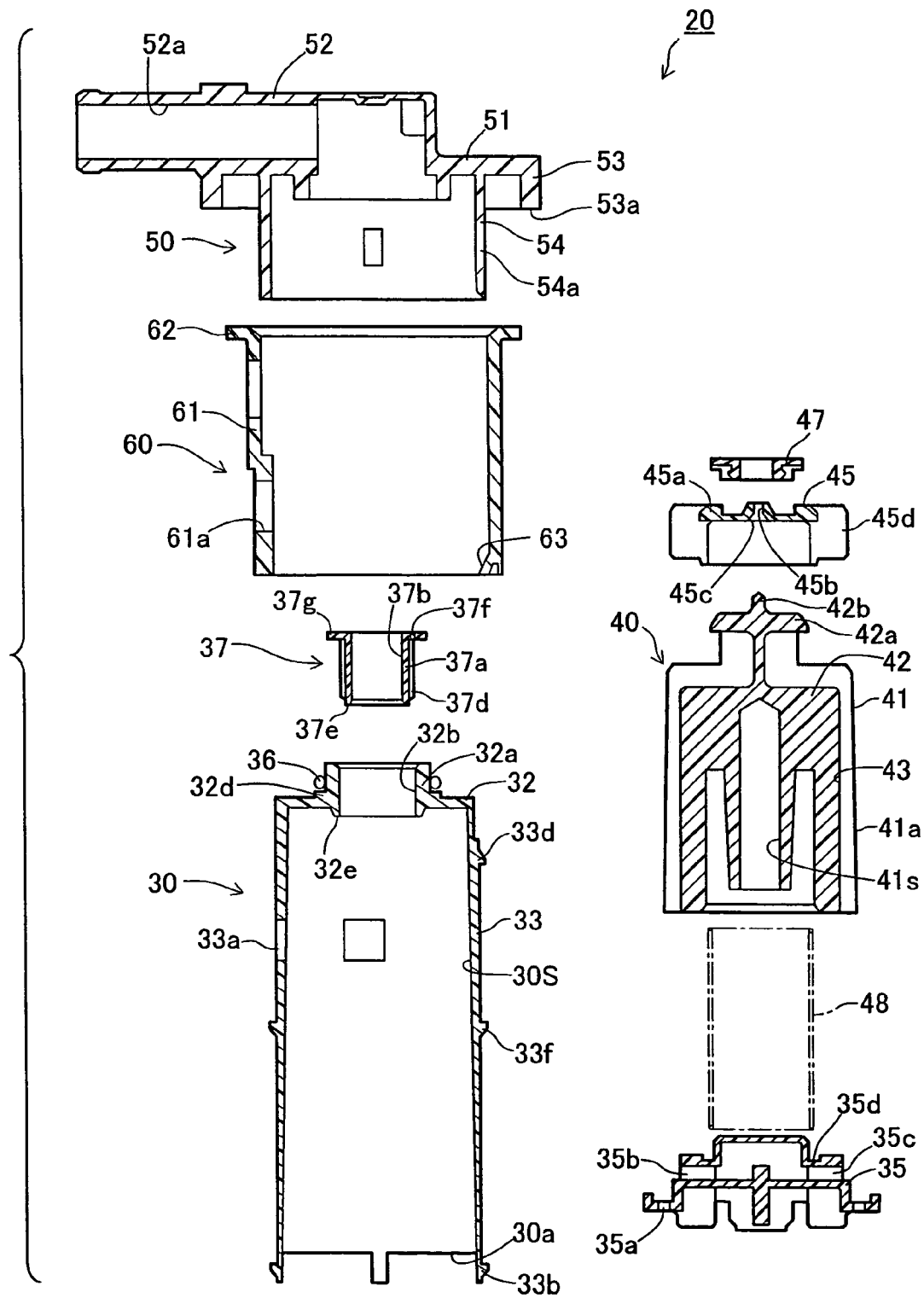
FIG. 2 is a decomposed sectional view of the fuel cutoff valve.

FIG. 2 is a decomposed sectional view of the fuel cutoff valve 20. The casing body 30 has a top wall 32 and a side wall 33 that is extended downward in a cylindrical shape from the top wall 32. The top wall 32 and the side wall 33 define a cup-like, bottom-opened valve chamber 30S, which has a bottom opening 30a. A cylindrical upper projection 32a protrudes from the center portion of the top wall 32. A circular through-hole functioning as a holder element 32b is formed through the upper projection 32a. A ring step 32d for supporting an O ring 36 as a sealing member thereon is formed around the outer side wall of the upper projection 32a. The lower end of the upper projection 32a forms a second sealing element 32e.

Figure 3:
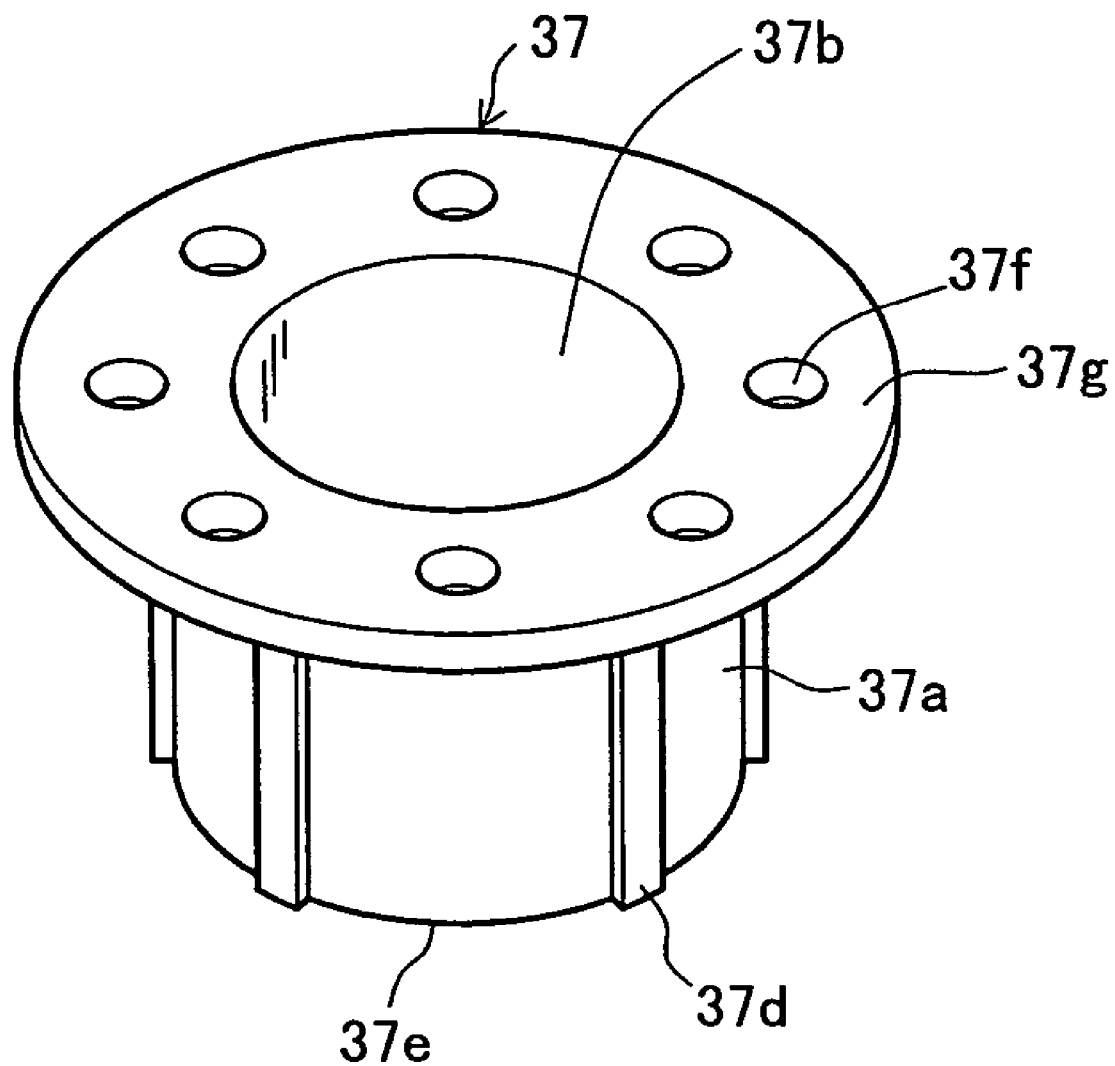
FIG. 3 is a perspective view showing a movable valve element.

The movable valve element 37 is set in the holder element 32b. FIG. 3 is a perspective view showing the movable valve element 37. The movable valve element 37 has a cylindrical movable main body 37a that forms a first connection conduit 37b therein. The lower end of the movable main body 37a forms a first sealing element 37e. Multiple ribs 37d are arranged at an interval around the outer wall of the movable main body 37a. A flange 37g with apertures 37f is formed on the top of the movable main body 37a. As shown in FIG. 2, the movable valve element 37 is fitted in the holder element 32b in a vertically slidable manner. A second connection conduit 38 (see FIG. 1) is defined by the space between the movable main body 37a and the holder element 32b and by the apertures 37f.

The side wall 33 has four connection holes 33a (only two are illustrated) arranged at an interval around the circumference thereof to connect the valve chamber 30S with the inside of the fuel tank FT. Catching claws 33b are protruded from the bottom of the side wall 33 to fix the bottom support plate 35 as discussed below.

The bottom support plate 35 closes the bottom opening 30a of the casing body 30. The catching claws 33b engage with fitting holes 35a, which are formed around the outer circumference of the bottom support plate 35, so as to close the bottom opening 30a of the casing body 30. A connection path 35b that connects the valve chamber 30S with the inside of the fuel tank FT in a roundabout course is formed in the bottom support plate 35. Namely the inside of the fuel tank FT is connected to the valve chamber 30S via the connection path 35b. Support legs 35c are radially arranged on the bottom support plate 35, and a ring-shaped spring support element 35d is formed on the support legs 35c. The spring 48 is spanned between the spring support element 35d and the inner lower face of the float 41.

The valve mechanism 40 has the float 41, an upper float 45 on the float 41, and a seat member 47 attached to the top of the upper float 45. The float 41 is designed to have a container-like shape including an upper wall 42 and a cylindrical side wall 43, which is formed downward from the outer circumference of the upper wall 42. The inner space of the float 41 forms a buoyancy chamber 41S to generate buoyancy. Eight guide projections 41a are formed as vertical ribs on the outer circumference of the float 41 and are arranged at an interval in the circumferential direction on the side wall 43 of the float 41. The upper wall 42 has a seat 42a, and a valve plug 42b is protruded from the center of the seat 42a.

The upper float 45 is held on the float 41 in a vertically movable manner and has a valve element connection hole 45b, which is formed on the center of a circular disc 45a and is opened and closed by the valve plug 42b. The lower end of the valve element connection hole 45b forms a third sealing element 45c. Eight fins 45d are radially arranged around the outer circumference of the circular disc 45a. The fins 45d are held between the outer circumference of the seat 42a and the inner face of the side wall 33 of the casing body 30 to hold the upper float 45 straight and to evenly make the upper float 45 lift up and down. The rubber seat member 47 is mounted on the upper float 45 to be seated on and separated from the first sealing element 37e and the second sealing element 32e.

The cover 50 includes a cover body 51, a tubular body 52 extended upward in an inverse L shape from the center of the cover body 51, a flange 53 formed around the cover body 51, and a fitting body 54 protruded downward from the cover body 51. These constituents are formed integrally. The tubular body 52 has a cover conduit 52a formed therein. One end of the cover conduit 52a is connected to the valve chamber 30S of the casing body 30, whereas the other end is connected to the canister (not shown). A ring welding element 53a is formed on the lower end of the flange 53 to be welded to the tank upper wall FTa of the fuel tank FT.

The casing body 30 is attached to the cover 50 by means of the following structure. The lower portion of the cover 50 forms the tubular fitting body 54 to make the upper section of the casing body 30 fitted therein. The fitting body 54 has four notches 54a (only two are illustrated) arranged in the circumferential direction. The side wall 33 of the casing body 30 has four mating projections 33d arranged in the circumferential direction. Engagement of the mating projections 33d with the notches 54a fixes the casing body 30 to the cover 50.

The support member 60 is located outside of the fitting body 54 and the upper portion of the casing body 30. The support member 60 has a tubular body 61. A flange 62 is formed on the top of the tubular body 61, and a taper section 63 is formed on the bottom of the tubular body 61. After fixation of the casing body 30 to the cover 50, the support member 60 is slipped upward on the casing body 30 and rides over fitting projections 33f of the casing body 30. The support member 60 is accordingly fixed to both the casing body 30 and the fitting body 54 of the cover 50. Even when the cover 50 is swollen with fuel to loosen the engagement of the mating projections 33d with the notches 54a, the support member 60 functions to securely hold the casing body 30 relative to the cover 50.

(3) Operations of Fuel Cutoff Valve 20

Figure 4:
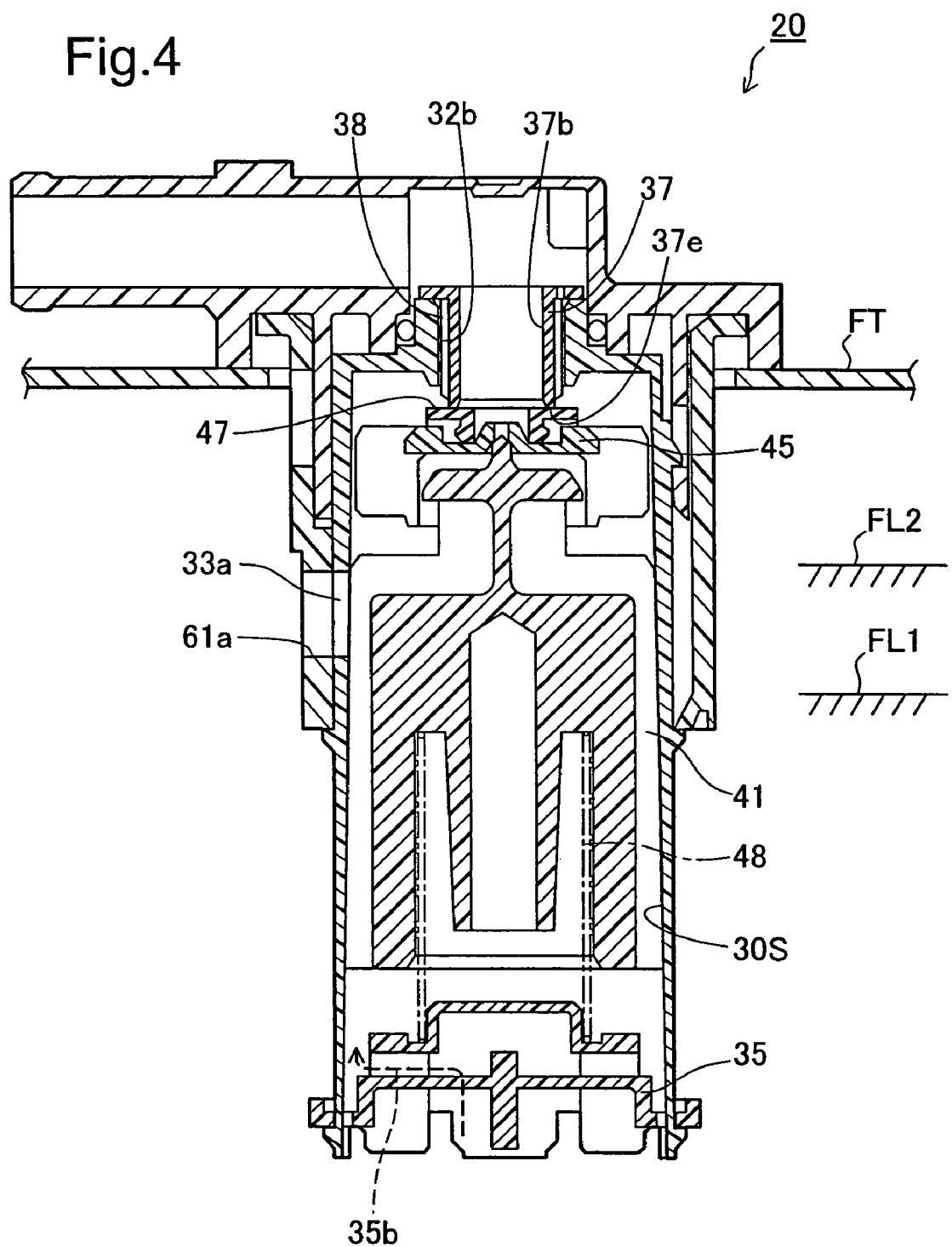
FIG. 4 shows a state of the fuel cutoff valve of the first embodiment.

The following describes the operations of the fuel cutoff valve 20 of the embodiment. As shown in FIG. 1, when a supply of fuel is fed into the fuel tank FT to raise the fuel level in the fuel tank FT, the fuel vapor remaining in the upper space of the fuel tank FT is flown into the valve chamber 30S through the apertures 61a and the connection holes 33a and through the connection path 35b of the bottom support plate 35 and is released from the valve chamber 30S through the first connection conduit 37b and the cover conduit 52a to the canister. When the fuel level in the fuel tank FT reaches the preset first fluid level FL1, the fuel flows through the connection path 35b of the bottom support plate 35 into the valve chamber 30S as shown in FIG. 4. When the sum of the buoyancy of the float 41 and the upward force of the load of the spring 48 exceeds the total downward force by the own weights of the float 41 and the upper float 45, the float 41 and the upper float 45 integrally move up and cause the seat member 47 to be seated on the first sealing element 37e of the movable valve element 37 and shut off the first connection conduit 37b. This structure effectively releases the fuel vapor from the fuel tank FT and prevents the fuel from flowing out of the fuel tank FT during the fuel supply to the fuel tank FT.

The location of the seat member 47 allows for further upward movement of the movable valve element 37. The inside of the fuel tank FT accordingly communicates with the canister via the second connection conduit 38 formed between the holder element 32b and the movable valve element 37. The passage area of the second connection conduit 38 is smaller than the passage area of the first connection conduit 37b, so that the internal pressure of the fuel tank FT increases. The increasing internal pressure of the fuel tank FT is detected by a fuel gun (not shown) and triggers an auto stop function to stop the fuel supply from the fuel gun. When the fuel level in the fuel tank FT reaches the preset first fluid level FL1, the second connection conduit 38 is sill open while the first connection conduit 37b is closed. This effectively prevents an abrupt increase in internal pressure of the fuel tank FT and thereby a blowing back flow of the fuel.

Figure 5:
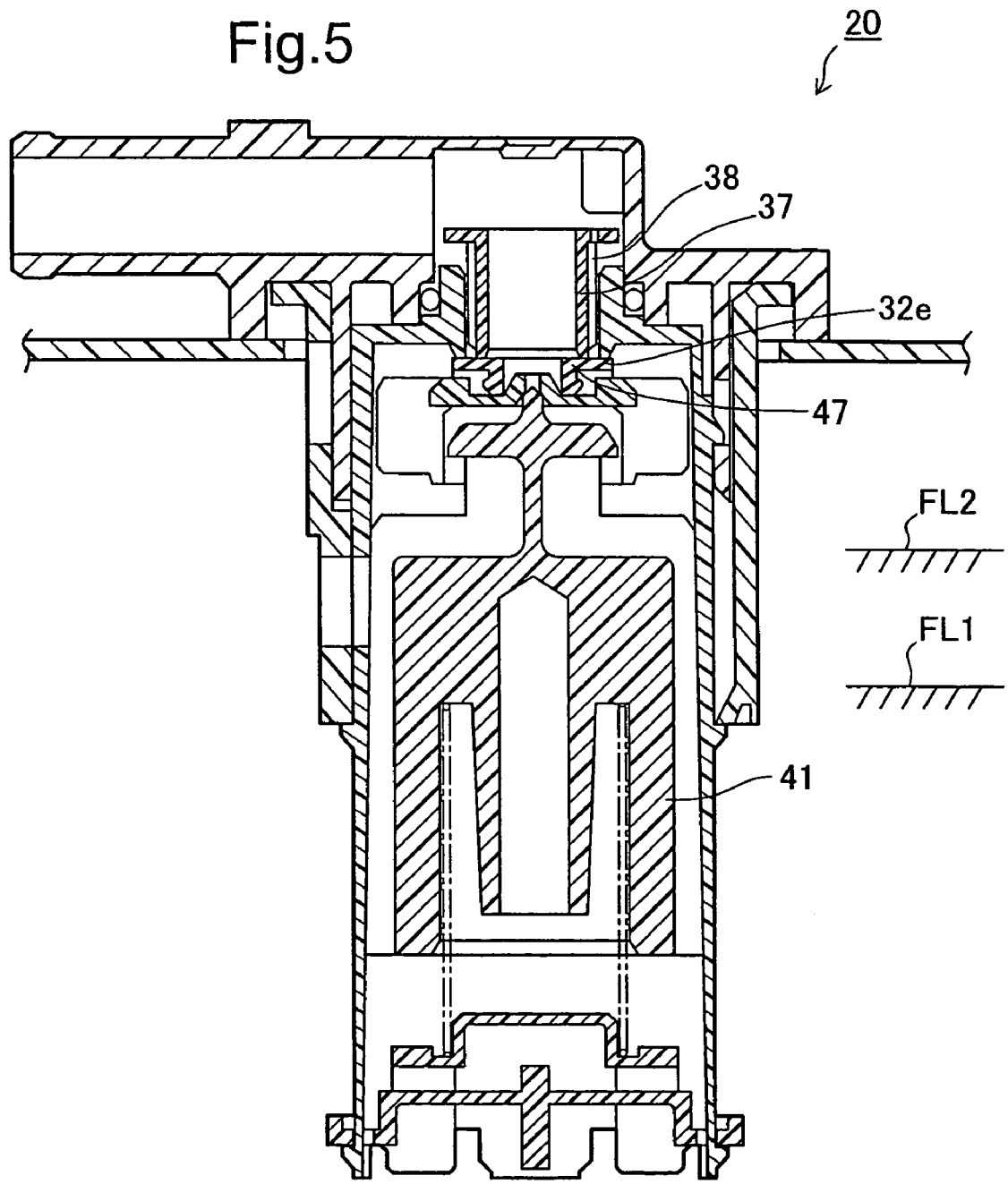
FIG. 5 shows a subsequent state of the fuel cutoff valve of the first embodiment after the state of FIG. 4.

When the further fuel supply makes the fuel level reach the preset second fluid level FL2, the buoyancy of the float 41 is enhanced. When the enhanced buoyancy exceeds the own weight of the movable valve element 37, the seat member 47 presses up the movable valve element 37 to be seated on the second sealing element 32e as shown in FIG. 5 and thereby shuts off the second connection conduit 38. The inside of the fuel tank FT is accordingly sealed from the canister to further increase the internal pressure of the fuel tank FT and stops the fuel supply from the fuel gun. The fuel cutoff valve 20 of this embodiment closes the fuel tank FT in two different stages relative to the canister. When the fuel level in the fuel tank FT reaches the preset first fluid level FL1, which is close to the full level, the structure of the embodiment prevents an abrupt increase in internal pressure of the fuel tank FT and thereby a blowing back flow of the fuel.

Figure 6:
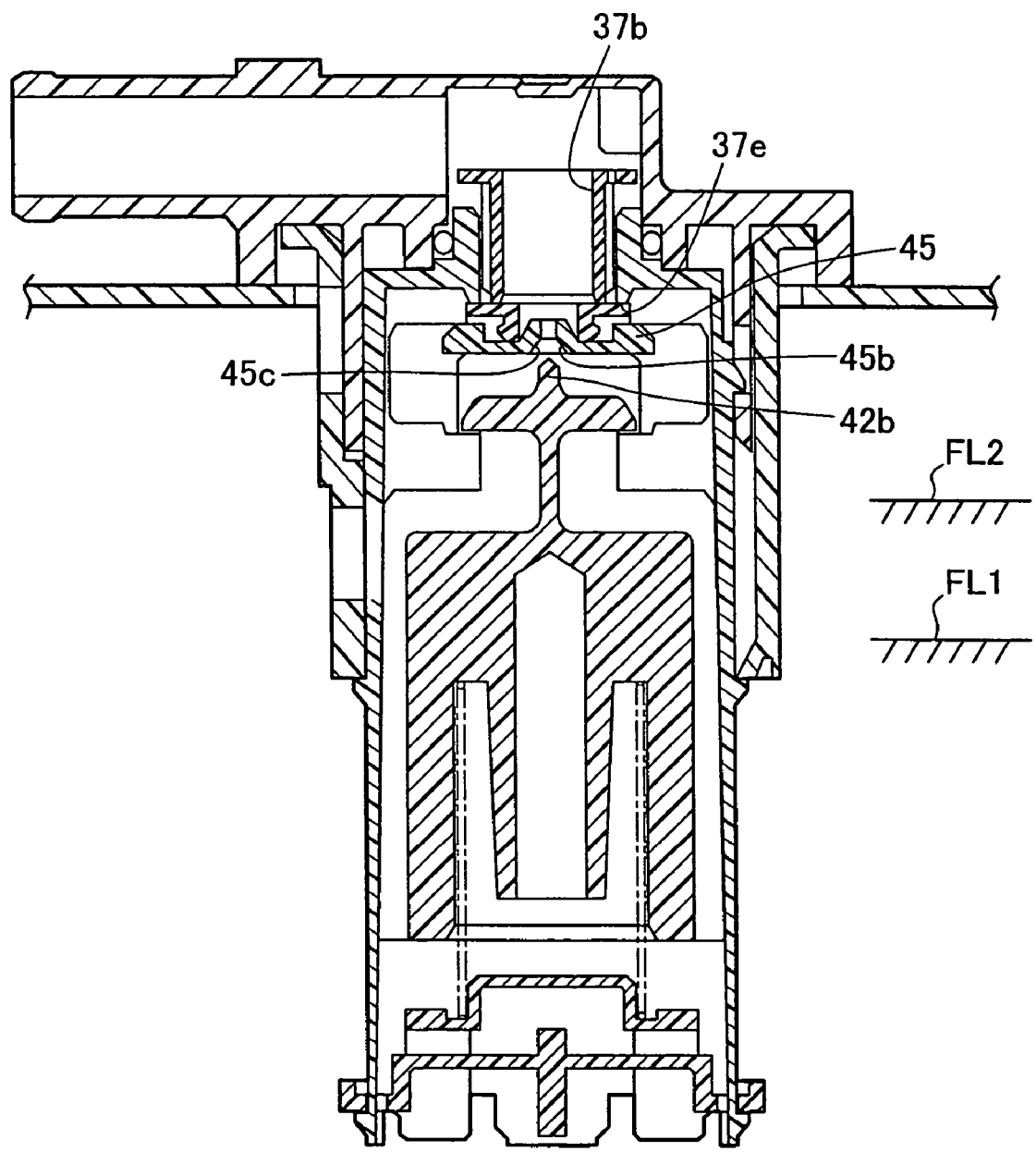
FIG. 6 shows a subsequent state of the fuel cutoff valve of the first embodiment after the state of FIG. 5.

When the fuel in the fuel tank FT is consumed and the fuel level in the fuel tank FT is lowered, the buoyancy of the float 41 decreases to move the float 41 down. The valve plug 42b of the float 41 is then separated from third sealing element 45c and opens the valve element connection hole 45b as shown in FIG. 6. The valve plug 42b of the float 41 has a cone shape and a narrow pressure-receiving area and accordingly possesses a relatively weak contact force to the periphery of the valve element connection hole 45b. Namely the valve plug 42b does not interfere with the down movement of the float 41. The float 41 thus quickly moves down to open the valve element connection hole 45b. The open valve element connection hole 45b causes the lower space pressure of the upper float 45 to be substantially equal to the pressure in the first connection conduit 37b. The smaller pressure difference weakens the contact force of the upper float 45 to the second sealing element 32e and thus smoothly moves the float 41 down. The upper float 45 functions to accelerate the valve-reopening properties and to smoothly move the float 41 down.

(4) Effects of the First Embodiment

The structure of the fuel cutoff valve 20 of the embodiment has the following effects, in addition to those discussed above.

Since the preset second fluid level FL2, which is higher than the preset first fluid level FL1, is specified by the own weight of the movable valve element 37 and the buoyancy of the float 41, this arrangement does not require any spring to regulate the second-stage floating position of the float as discussed in the prior art technique. This simplifies the assembly of the fuel cutoff valve and does not require any subtle regulation of the spring load.

Since the movable valve element 37 is attached to the casing body 30, this desirably simplifies the structure of the fuel cutoff valve, compared with the prior art structure that attaches a valve element to the top of a float.

B. Second Embodiment

Figure 7:
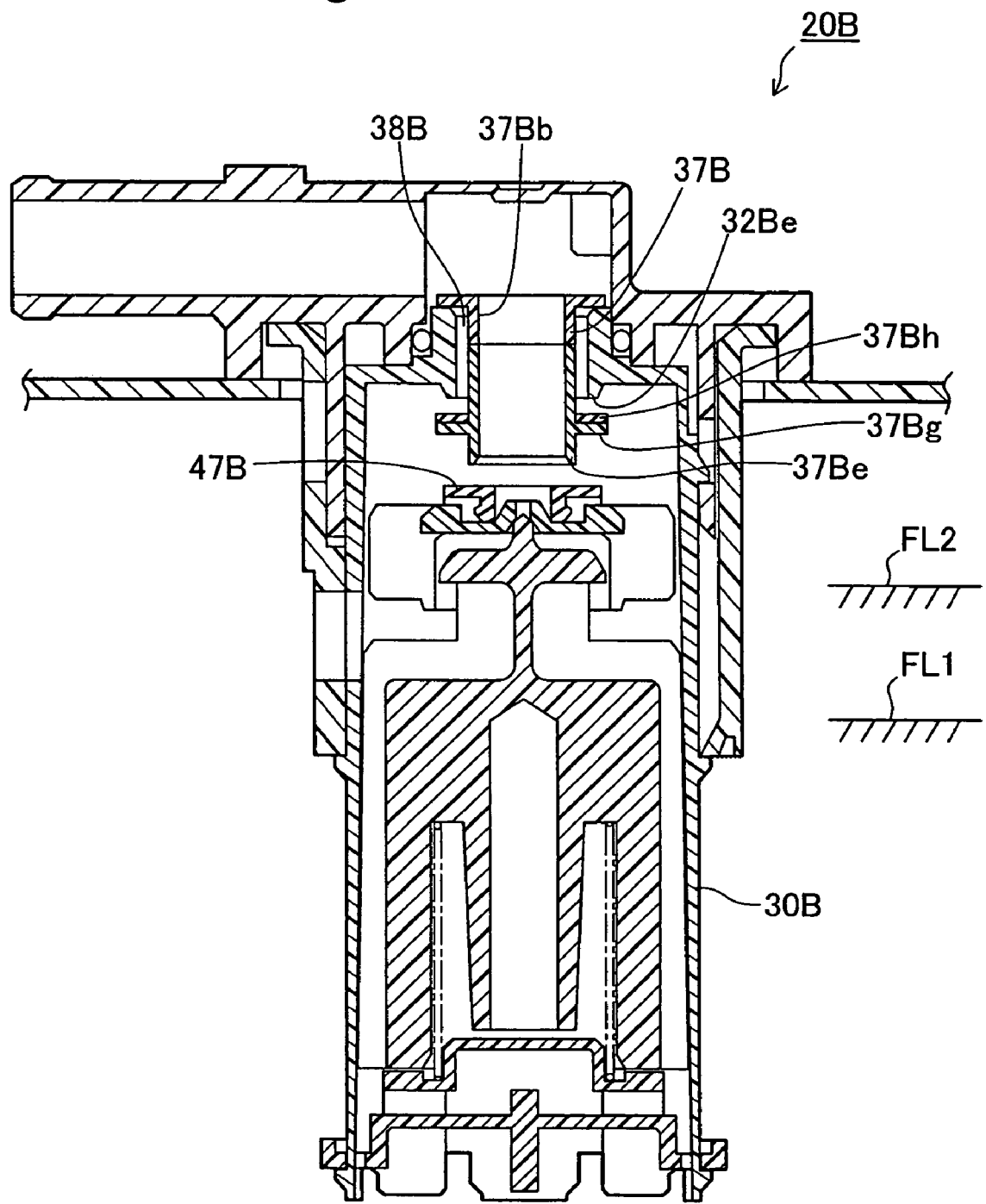
FIG. 7 is a sectional view showing a fuel cutoff valve in a second embodiment of the invention.

FIG. 7 is a sectional view illustrating a fuel cutoff valve 20B in a second embodiment of the invention. The main characteristic of the fuel cutoff valve 20B of the second embodiment is that a movable valve element 37B has a valve member to close a second sealing element 32Be of a casing body 30B. The movable valve element 37B has a flange 37Bg and a second seat member 37Bh that is attached to the top face of the flange 37Bg. In the fuel cutoff valve 20B of this structure, when the fuel level reaches the preset first fluid level FL1, a first seat member 47B is seated on a first sealing element 37Bb to shut off a first connection conduit 37Bb. When the fuel level reaches the preset second fluid level FL2, the second seat member 37Bh of the movable valve element 37B is seated on the second sealing element 32Be to shut off a second connection conduit 38B. The place of opening and closing the second connection conduit 38B with the movable seat member may be determined appropriately according to the structure. The movable valve element 37B may have split members, which are joined with each other by means of catches. This simplifies the assembly of the whole fuel cutoff valve.

C. Third Embodiment

Figure 8:
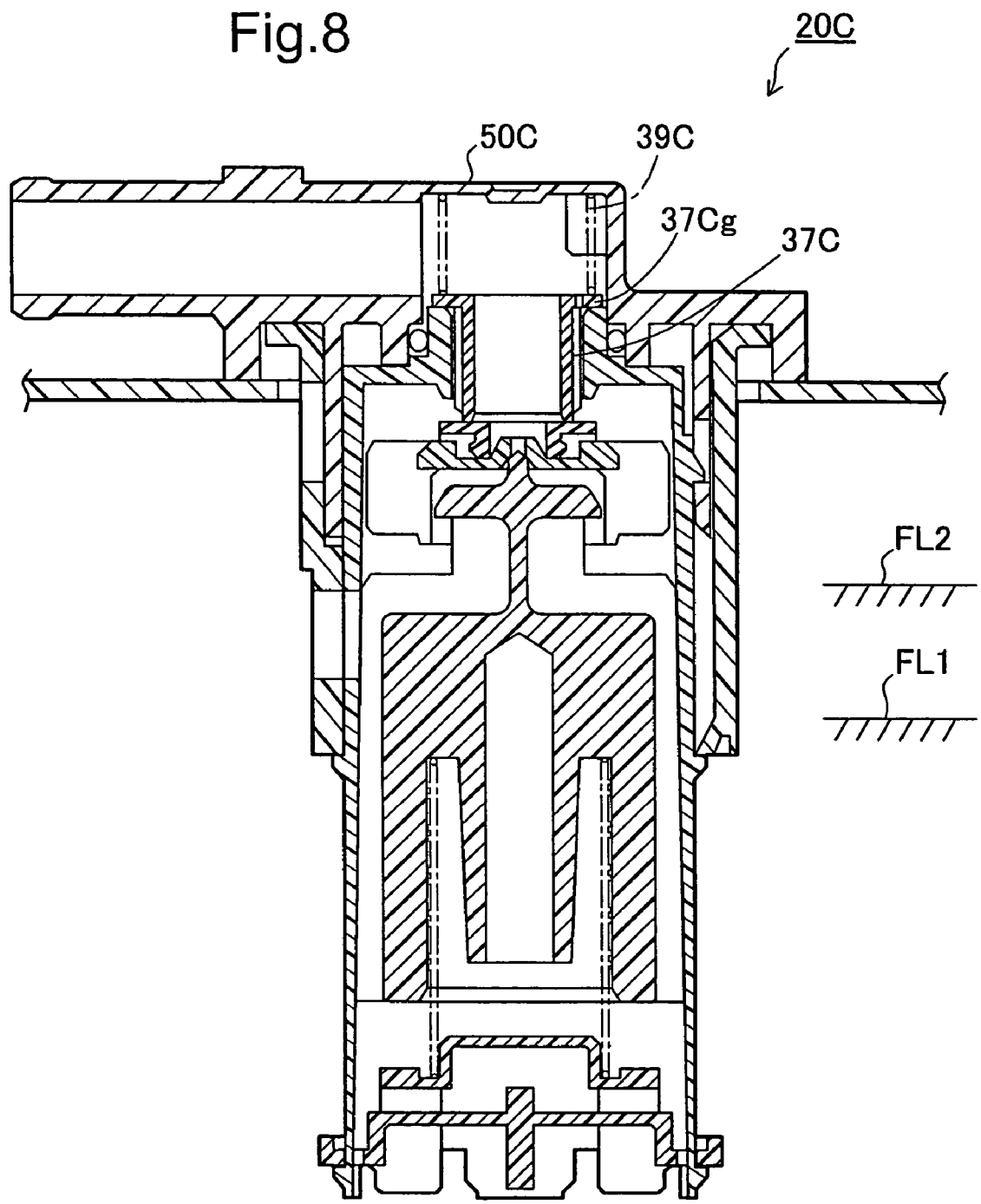
FIG. 8 is a sectional view showing a fuel cutoff valve in a third embodiment of the invention.

FIG. 8 is a sectional view illustrating a fuel cutoff valve 20C in a third embodiment of the invention. The main characteristic of the fuel cutoff valve 20C of the third embodiment is that a spring is used as an auxiliary load to close a movable valve element 37C. A spring 39C is spanned between a flange 37Cg of the movable valve element 37C and an upper inner wall of a cover 50C to press the movable valve element 37C downward. The spring 39C effectively gives a stable valve-opening force, when the movable valve element 37C has a relatively small weight and is readily opened by the air current.

A plumb may be attached or insert-molded as the additional force of pressing the movable valve element downward, in place of or in addition to the spring.

D. Fourth Embodiment

Figure 9:
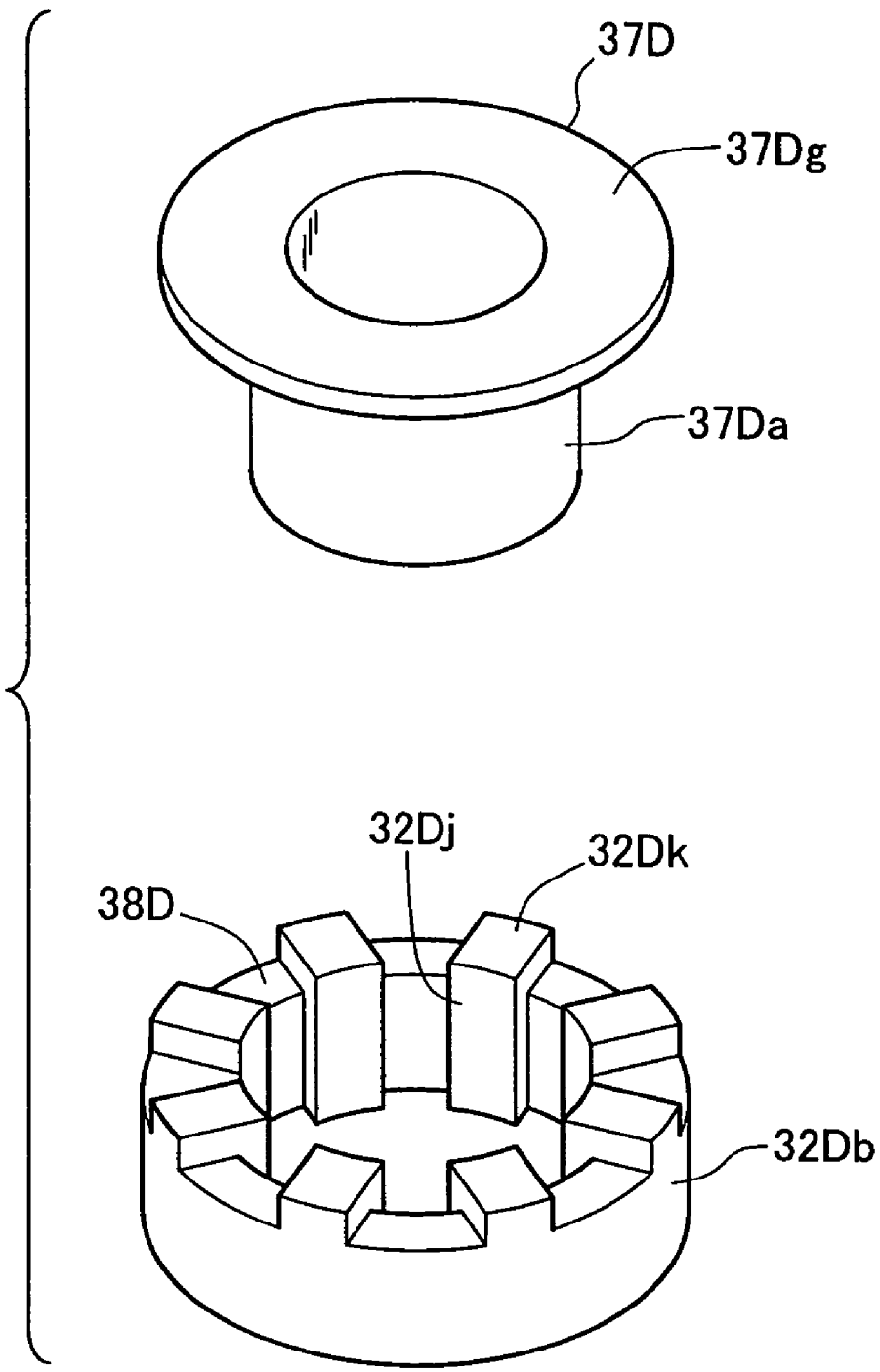
FIG. 9 is a perspective view showing periphery of a movable valve element included in a fuel cutoff valve in a fourth embodiment of the invention.

FIG. 9 is a perspective view showing periphery of a movable valve element 37D included in a fuel cutoff valve in a fourth embodiment of the invention. In the illustration, the movable valve element 37D is detached from a holder element 32Db. The main characteristic of the fuel cutoff valve 20D of the fourth embodiment is the structure of a second connection conduit 38D. Multiple ribs 32Dj formed in the vertical direction are protruded from the inner circumferential wall of the holder element 32Db. The outer circumferential wall of the movable valve element 37D has a cylindrical shape. Multiple ribs 32Dk arranged radially are protruded from the top face of the holder element 32Db to be linked with the corresponding ribs 32Dj. The second connection conduit 38D is accordingly defined by the space between a movable main body 37Da of the movable valve element 37D and the multiple ribs 32Dj and the space between a flange 37Dg and the multiple ribs 32Dk. The multiple ribs 32Dk may be formed on the lower face of the flange 37Dg, instead of the top face of the holder element 32Db.

E. Fifth Embodiment

Figure 10:
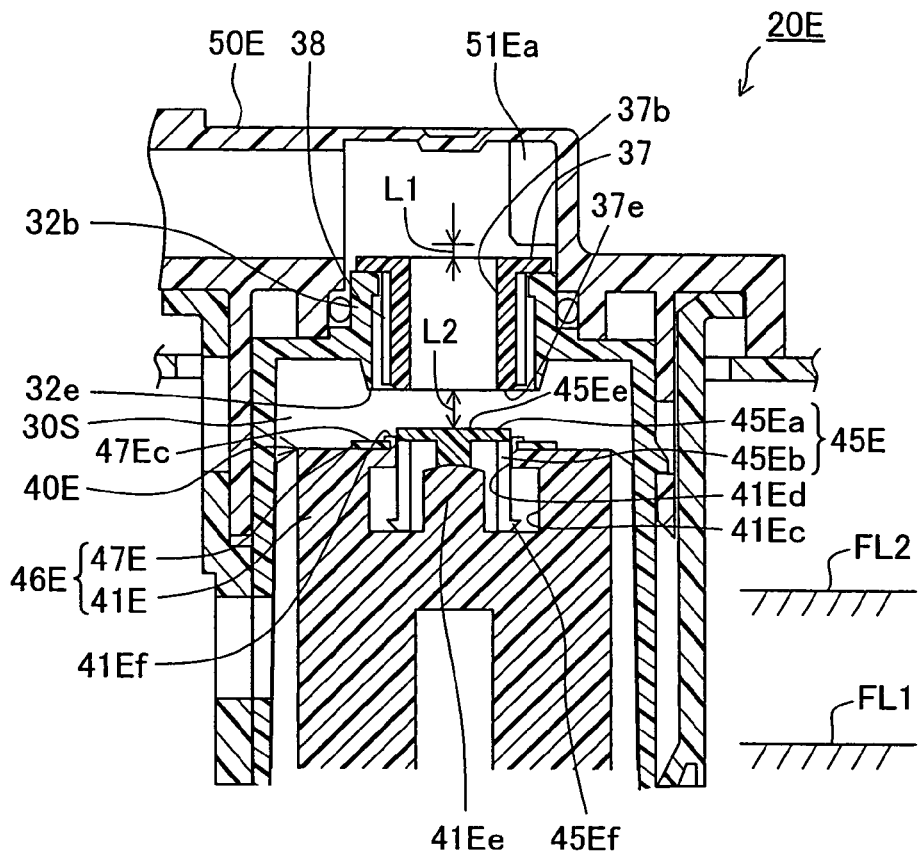
FIG. 10 is a sectional view showing an upper portion of a fuel cutoff valve in a fifth embodiment of the invention.

FIG. 10 is a sectional view showing an upper portion of a fuel cutoff valve 20E in a fifth embodiment of the invention. The main characteristic of the fuel cutoff valve 20E of the fifth embodiment is that the valve mechanism has two valve disc mechanisms. A valve mechanism 40E includes a first valve disc 45E as a first valve disc mechanism and a second valve disc mechanism 46E that has a float 41E to move up and down according to the fuel level and supports the first valve disc 45E in a vertically movable manner.

Figure 11:
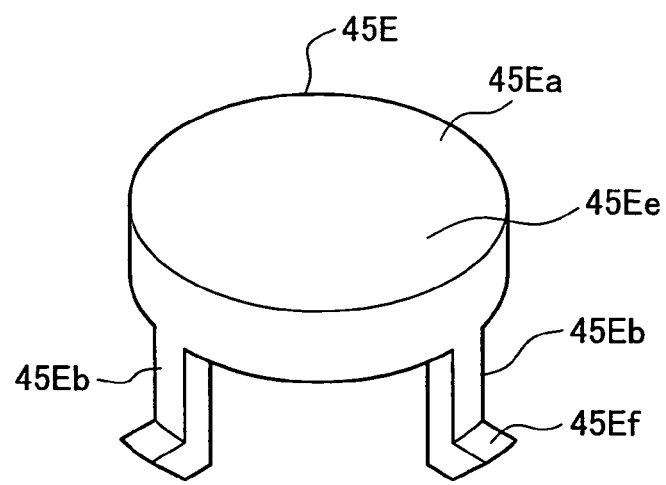
FIG. 11 is a perspective view showing a first valve disc in the fuel cutoff valve of the fifth embodiment.

FIG. 11 is a perspective view showing the first valve disc 45E. The first valve disc 45E has a disc-shaped top wall 45Ea and four legs 45Eb protruded downward from the lower face of the top wall 45Ea. The upper face of the top wall 45Ea forms a first seat plane 45Ee. Each of the legs 45Eb has a claw 45Ef on its lower end. The first valve disc 45E is light in weight to move up on the flow of fuel vapor from the valve chamber 30S to the first connection conduit 37b as shown in FIG. 10.

The second valve disc mechanism 46E has the float 41E and a rubber seat member 47E attached to the top of the float 41E. The float 41E has an upper support member that supports the first valve disc 45E in a vertically movable manner. The upper support member of the float 41E has an upper recess 41Ec. The upper recess 41Ec has an opening 41Ed of a narrower area. The claws 45Ef of the first valve disc 45E are stuck with the periphery of the narrow opening 41Ed, so that the first valve disc 45E does not slip off the float 41E. A support projection 41Ee is protruded upward from the center of the upper recess 41Ec to come into contact with and hold a lower center projection of the first valve disc 45E.

The seat member 47E has a second seat plane 47Ec, which is seated on the second sealing element 32e, and is held by an upper holding element 41Ef of the float 41E.

A restriction element 51Ea is formed on the inner wall of the cover 50E to control the position of the upward movement of the movable valve element 37. The restriction element 51Ea is designed to fulfill a relation of L1<L2, where L1 represents the allowable distance of the movement of the movable valve element 37 and L2 represents the allowable distance of the upward movement of the first valve disc 45E.

Figure 12:
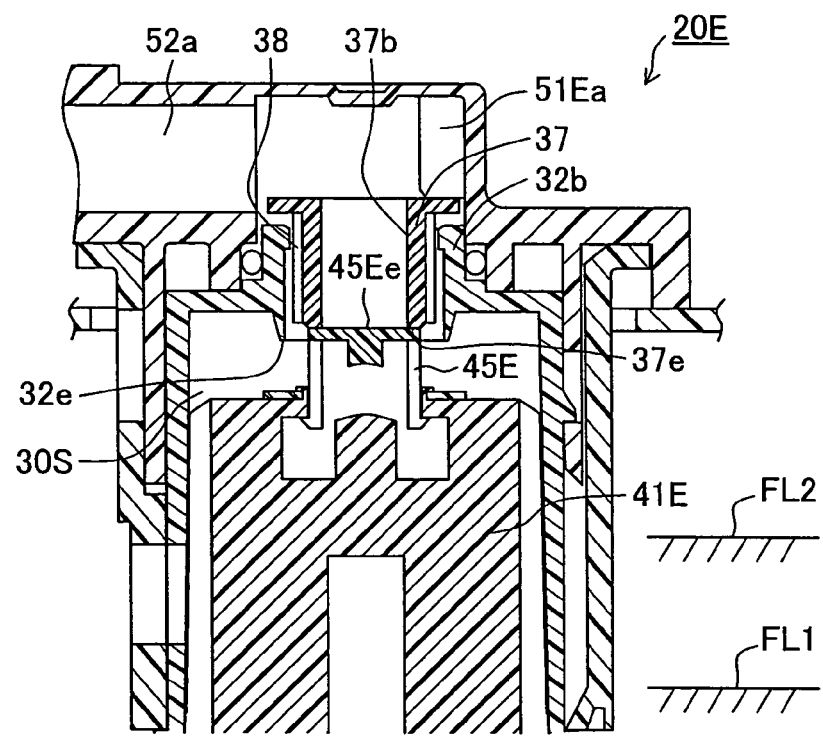
FIG. 12 shows a state of the fuel cutoff valve of the fifth embodiment.

The following describes the operations of the fuel cutoff valve 20E of the fifth embodiment. When the fuel level in the valve chamber 30S reaches the preset first fluid level FL1, the float 41E and the first valve disc 45E integrally move up. The upward movement reduces the passage area between the first valve disc 45E and the lower end of the movable valve element 37 and increases the flow rate of fuel vapor from the valve chamber 30S to the first connection conduit 37b. The increased flow rate sucks the first valve disc 45E up and causes the first valve disc 45E to be seated on the first sealing element 37e and shut off the first connection conduit 37b as shown in FIG. 12. The movable valve element 37 comes into contact with the restriction element 51Ea, which restricts the further upward movement of the movable valve element 37. This arrangement effectively prevents a gap from being formed between the movable valve element 37 and the first valve disc 45E by the ascending flow of fuel vapor and ensures the sufficient sealing properties.

In this state, the second connection conduit 38 formed between the holder element 32b and the movable valve element 37 is open on the periphery of the first valve disc 45E. The passage area from the valve chamber 30S to the cover conduit 52a is narrowed by the closure of the first connection conduit 37b, so as to raise the internal pressure of the fuel tank FT. When the fuel level in the fuel tank FT reaches the preset first fluid level FL1, the second connection conduit 38 is kept open while the first connection conduit 37b is closed.

Figure 13:
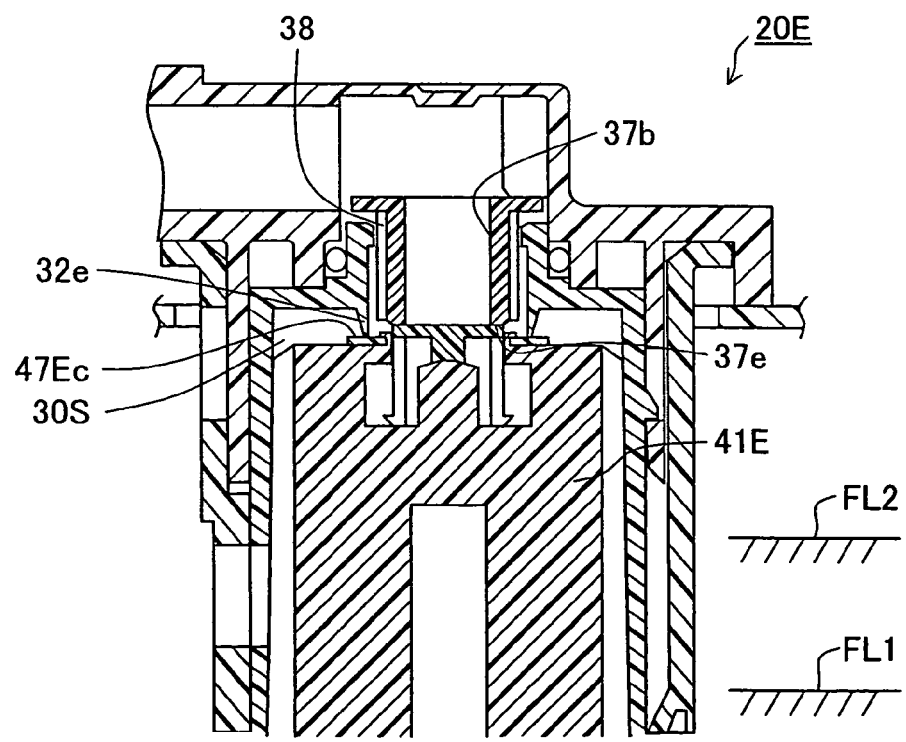
FIG. 13 shows a subsequent state of the fuel cutoff valve of the fifth embodiment after the state of FIG. 12.

When the further fuel supply raises the fuel level in the valve chamber 30S to the preset second fluid level FL2, the float 41E moves up by the increased buoyancy and causes the second seat plane 47Ec to be seated on the second sealing element 32e and shut off the second connection conduit 38, as shown in FIG. 13. The fuel tank FT is thus sealed from the canister.

When the fuel level in the valve chamber 30S is lowered by consumption of the fuel, the float 41E decreases its buoyancy and moves down. The second seat plane 47Ec is then separated from the second sealing element 32e to open the second connection conduit 38. The further downward motion of the float 41E makes the first seat plane 45Ee separated from the first sealing element 37e to open the first connection conduit 37b, as shown in FIG. 10.

In the structure of the fuel cutoff valve 20E of the fifth embodiment, when the fuel level reaches the preset first fluid level FL1 in the course of fuel supply, even in the presence of the strong ascending flow of fuel vapor from the valve chamber 30S to the first connection conduit 37b, only the light-weight first valve disc 45E is seated to close the first connection conduit 37b. The float 41E that is heavier than the first valve disc 45E does not move up to the position of closing the second connection conduit 38. Namely the second connection conduit 38 is kept open in this state. Even in the presence of the strong ascending flow of fuel vapor, the float 41E does not move up to the position of closing the second connection conduit 38, before the fuel level reaches the preset second fluid level FL2. This arrangement ensures the two-step increase of the internal pressure of the fuel tank FT according to the fuel level in the fuel tank FT.

F. Sixth Embodiment

Figure 14:
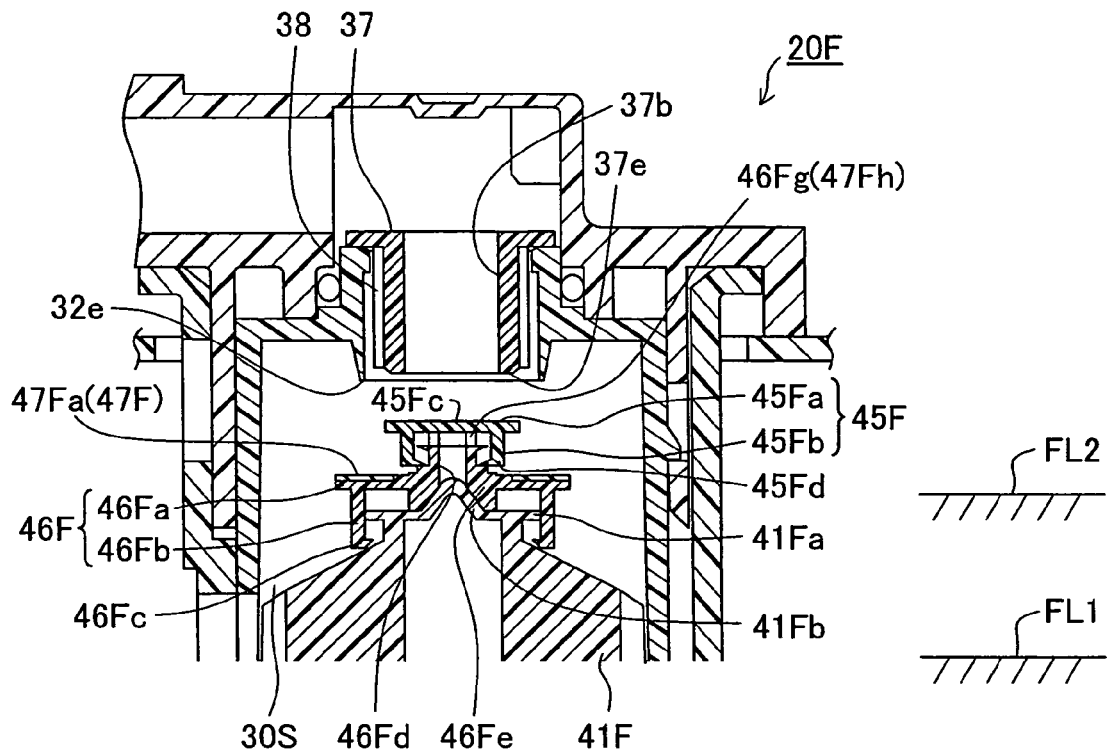
FIG. 14 is a sectional view showing an upper portion of a fuel cutoff valve in a sixth embodiment of the invention.

FIG. 14 is a sectional view showing an upper portion of a fuel cutoff valve 20F in a sixth embodiment of the invention. The main characteristics of the fuel cutoff valve 20F of the sixth embodiment are the structure of the valve mechanism having two valve disc mechanisms and the enhanced valve-reopening properties.

The valve mechanism of the fuel cutoff valve 20F includes a first valve disc mechanism having a first valve disc 45F and a second valve disc mechanism having a second valve disc 46F and a float 41F. The first valve disc 45F of the first valve disc mechanism has a disc-shaped top wall 45Fa and legs 45Fb protruded downward from the lower face of the top wall 45Fa. The upper face of the top wall 45Fa forms a first seat plane 45Fc, which is seated on the first sealing element 37e. Each of the legs 45Fb has a claw 45Fd on its lower end. The first valve disc 45F is light in weight to move up on the flow of fuel vapor from the valve chamber 30S to the first connection conduit 37b.

The second valve disc mechanism has the float 41F and the second valve disc 46F held on the float 41F in a vertically movable manner. The second valve disc 46F has a disc-shaped top wall 46Fa and legs 46Fb protruded downward from the lower face of the top wall 46Fa. A rubber sealing member 47F is mounted on the upper face of the top wall 46Fa. The upper face of the sealing member 47F forms a second seat plane 47Fa, which is seated on the second sealing element 32e. Each of the legs 46Fb has a claw 46Fc on its lower end. The claws 46Fc are stuck with an upper flange 41Fa of the float 41F to prevent the second valve disc 46F from slipping off the float 41F. A valve disc connection hole 46Fd is formed on the center of the second valve disc 46F to pass through the second valve disc 46F. The lower inner circumference of the valve disc connection hole 46Fd forms a third sealing element 46Fe, which is opened and closed by a valve plug 41Fb of the float 41F. The top wall 46Fa has four projections 46Fg protruded upward and arranged at an interval of 90 degrees in the circumferential direction. There is a gap 46Fh between the adjoining projections 46Fg. The projections 46Fg function to reduce the contact area with the top wall 45Fa of the first valve disc 45F and ensure the smooth movement of the first valve disc 45F.

Figure 15:
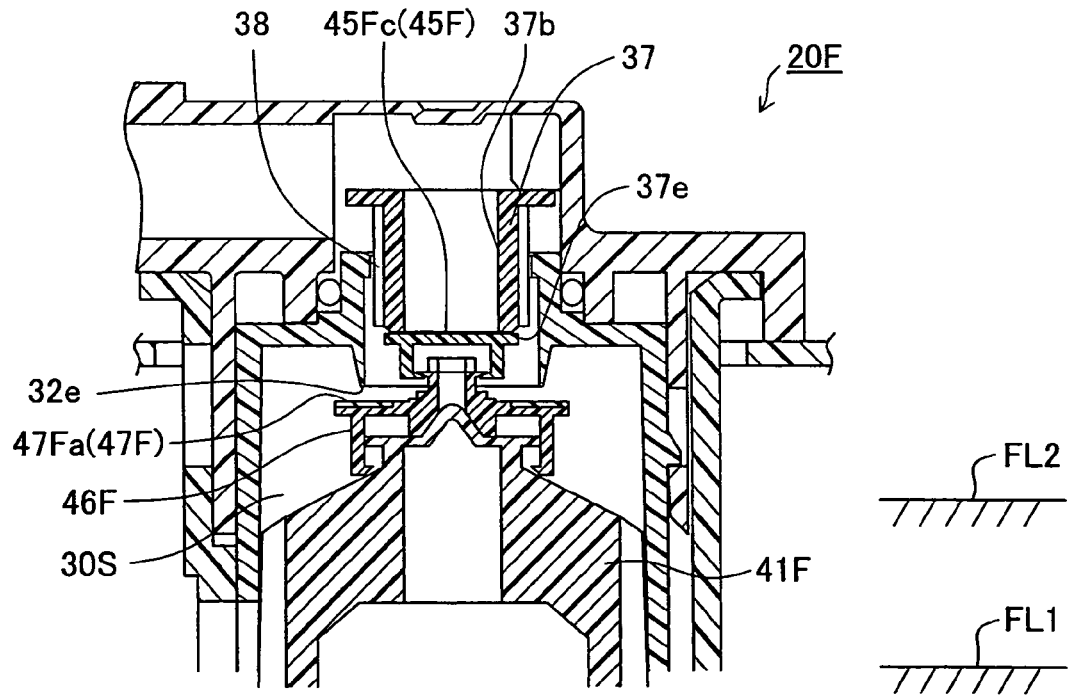
FIG. 15 shows a state of the fuel cutoff valve of the sixth embodiment.
Figure 16:
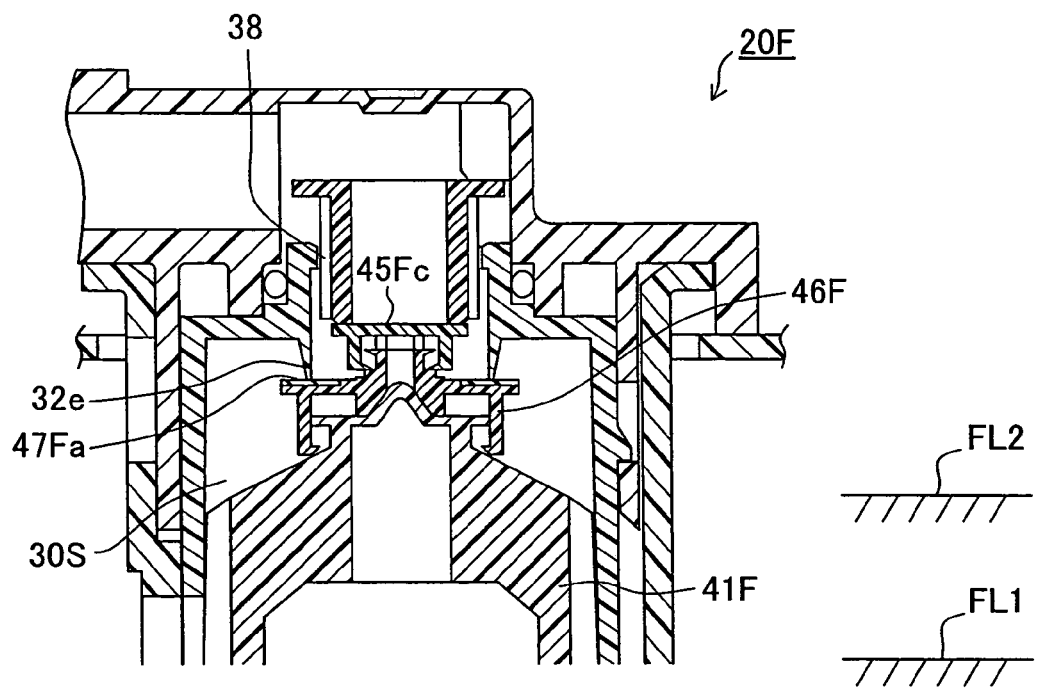
FIG. 16 shows a subsequent state of the fuel cutoff valve of the sixth embodiment after the state of FIG. 15.

The following describes the operations of the fuel cutoff valve 20F of the sixth embodiment. When the fuel level in the valve chamber 30S reaches the preset first fluid level FL1, the first valve disc 45F moves up with the float 41F. The upward movement reduces the passage area between the first valve disc 45F and the lower end of the movable valve element 37 and causes the first valve disc 45F to be sucked up, be seated on the first sealing element 37e of the movable valve element 37, and shut off the first connection conduit 37b, as shown in FIG. 15. The second valve disc 46F is heavier than the first valve disc 45F and does not move up by the ascending flow but keeps the opening state of the second connection conduit 38. When the further fuel supply raises the fuel level in the valve chamber 30S to the preset second fluid level FL2, the float 41F increases its buoyancy and moves up with the second valve disc 46F, as shown in FIG. 16. The second seat plane 47Fa is seated on the second sealing element 32e to shut off the second connection conduit 38.

Figure 17:
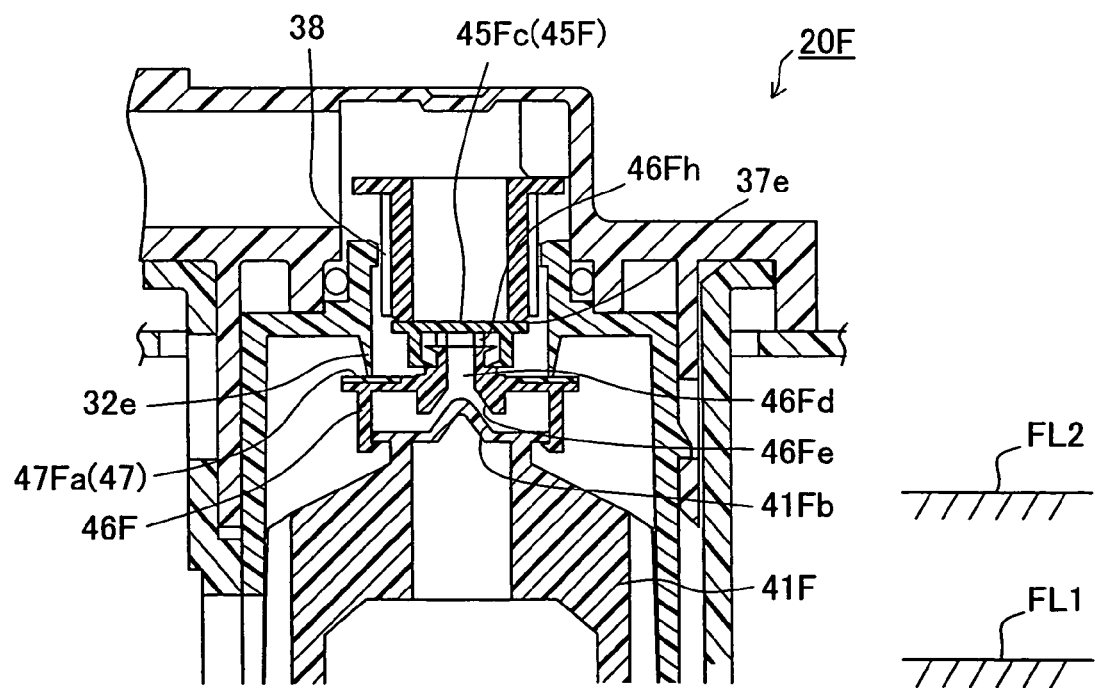
FIG. 17 shows a subsequent state of the fuel cutoff valve of the sixth embodiment after the state of FIG. 16.
Figure 18:
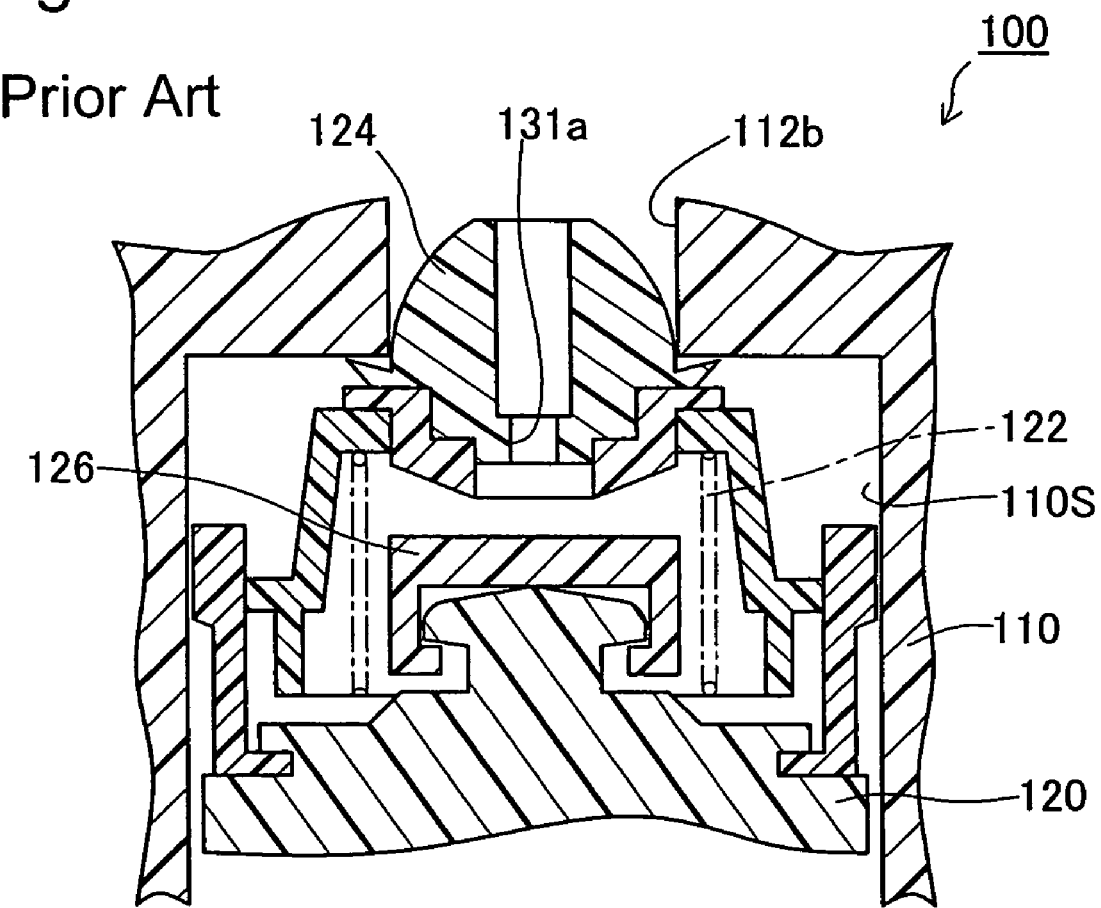
FIG. 18 is a sectional view showing a prior art fuel cutoff valve attached to the top of a fuel tank.

When the fuel consumption lowers the fuel level in the valve chamber 30S, the float 41F decreases its buoyancy and moves down as shown in FIG. 17. The valve plug 41Fb of the float 41F is then separated from the third sealing element 46Fe to open the valve disc connection hole 46Fd. The valve plug 41Fb of the float 41F has a cone shape and a narrow pressure-receiving area and accordingly possesses a relatively weak contact force to the third sealing element 46Fe. The float 41F thus quickly moves down to open the valve disc connection hole 46Fd.

The open valve disc connection hole 46Fd causes the internal pressure of the fuel tank FT to go through the gaps 46Fh to the second connection conduit 38. This eliminates the pressure difference between the upper face and the lower face of the second valve disc 46F and the pressure difference between the upper face and the lower face of the first valve disc 45F. The second seat plane 47Fa is then separated from the second sealing element 32e, and the first seat plane 45Fc is separated from the first sealing element 37e. The three-step structure of the float 41F, the first valve disc 45F, and the second valve disc 46F ensures the smooth valve-reopening operations to open the first connection conduit 37b and the second connection conduit 38.

The embodiments discussed above are to be considered in all aspects as illustrative and not restrictive. There may be many modifications, changes, and alterations without departing from the scope or spirit of the main characteristics of the present invention. One example of possible modification is given below.

In the embodiments discussed above, the passage area of the second connection conduit is constant, while the movable valve element moves up and down. One modified structure reduces the passage area of the second connection conduit proportionally or stepwise with the upward movement of the movable valve element. This ensures the gradual variation of the passage area.

All changes within the meaning and range of equivalency of the claims are intended to be embraced therein. The scope and spirit of the present invention are indicated by the appended claims, rather than by the foregoing description.

What is claimed is:

1. A fuel cutoff valve that is attached to an upper wall of a fuel tank, and works by a liquid level in the fuel tank, the fuel cutoff valve comprising:
    a casing body that has a valve chamber to connect inside of the fuel tank with outside and a holder element located above the valve chamber;
    a movable valve element that is held by the holder element in a vertically movable manner;
    a first connection conduit and a second connection conduit that are provided to face the movable valve element and to connect inside of the valve chamber with the outside, wherein the area of the first connection conduit is larger than that of the second connection conduit; and
    a valve mechanism that is received in the valve chamber and has a float moving up and down according to the fuel level in the fuel tank, wherein the valve mechanism has a seat plane, the seat plane being configured to move up with an upward movement of the float to shut off the first connection conduit when the fuel level rises to a preset first fluid level, and to move up with a further upward movement of the float to press the movable valve element up and to shut off the second connection conduit when the fuel level rises to a preset second fluid level that is higher than the preset first fluid level wherein the first conduit connection is formed in the movable main body and the second connection conduit is formed between the movable valve element and the holder element and connects the valve chamber with the outside except when the seat plane shuts off the second connection conduit.

2. The fuel cutoff valve in accordance with claim 1, wherein the movable valve element has a cylindrical movable main body, and the second connection is formed in a space between the movable main body and the holder element.

3. The fuel cutoff valve in accordance with claim 2, wherein the space is defined between multiple ribs protruded from an outer circumferential wall of the movable valve element and an inner circumferential wall of the bolder element.

4. The fuel cutoff valve in accordance with claim 3, wherein a flange with apertures is formed on an upper end of the movable valve element, the apertures being connected with the space to form the second connection conduit.

5. The fuel cutoff valve in accordance with claim 2, wherein the space is defined between multiple ribs protruded from an inner circumferential wall of the holder element and an outer circumferential wall of the movable valve element.

6. The fuel cutoff valve in accordance with claim 2, wherein a flange is formed on an upper end of the movable valve element, and the space has a first space and a second space, the first space being defined between multiple ribs protruded from an inner circumferential wall of the holder element and an outer circumferential wall of the movable valve element, and the second space being defined between multiple ribs protruded from an upper end of the holder element and a lower wall of the flange.

7. The fuel cutoff valve in accordance with claim 2, wherein the seat plane is located above the float and is configured to open and close the first connection conduit and the second connection conduit.

8. The fuel cutoff valve in accordance with claim 7, wherein the seat plane is formed on a seat member attached to an upper portion of the float.

9. The fuel cutoff valve in accordance with claim 1, further comprising a first seat member and a second seat member, the first seat member being located on the float to open and close the first connection conduit, and the second seat member being formed on the movable valve element to open and close the second connection conduit.

10. The fuel cutoff valve in accordance with claim 1, further comprising a spring that presses against an upward force of the movable valve element.

11. The fuel cutoff valve in accordance with claim 1, wherein the valve mechanism comprises: (i) a first valve disc mechanism having a first valve disc; and (ii) a second valve disc mechanism having the float, the float supporting the first valve disc in a vertically movable manner, and the seat plane has a first seat plane and a second seat plane, the first seat plane being formed on an upper portion of the first valve disc and being configured to move up on a flow of fuel vapor from the valve chamber to the first connection conduit and shut off the first connection conduit when the fuel level rises to the preset first fluid level, the second seat plane being formed on an upper portion of the float and being configured to shut off the second connection conduit with an upward movement of the float when the fuel level rises to the preset second fluid level.

12. The fuel cutoff valve in accordance with claim 1, wherein the valve mechanism comprises: (i) a first valve disc mechanism having a first valve disc; and (ii) a second valve disc mechanism having the float and a second valve disc formed as a separate body on the float, and the seat plane has a first seat plane and a second seat plane, the first seat plane being formed on un upper portion of the first valve disc and being configured to move up on a flow of fuel vapor from the valve chamber to the first connection conduit and shut off the first connection conduit when the fuel level rises to the preset first fluid level, the second seat plane being formed on top of the second valve disc and being configured to shut off the second connection conduit with an upward movement of the float when the fuel level rises to the preset second fluid level.

13. The fuel cutoff valve in accordance with claim 12, wherein the second valve disc has a valve disc connection hole that passes through the second valve disc, and the float has a valve plug that opens and closes the valve disc connection hole with a vertical movement of the float.

14. The fuel cutoff valve in accordance with claim 1, wherein the valve mechanism includes a valve element supported on an upper portion of the float, the valve element having the seat plane on an upper portion of the valve element and a valve disc connection hole that passes through the valve element, the valve disc connection hole being configured to be opened and closed by a valve plug formed on the float with a vertical movement of the float.

* * * * *